United States Patent [19]

Thom et al.

[11] Patent Number: 5,580,518

[45] Date of Patent: Dec. 3, 1996

[54] CARBON OR BORON MODIFIED TITANIUM SILICIDE

[75] Inventors: Andrew J. Thom, Slater; Mufit Akinc, Ames, both of Iowa

[73] Assignee: Iowa State University Research Foundation, Ames, Iowa

[21] Appl. No.: 273,955

[22] Filed: Jul. 12, 1994

[51] Int. Cl.[6] .................................................. C22C 14/00
[52] U.S. Cl. .......................................... 420/417; 148/421
[58] Field of Search ............................. 420/417; 148/421

[56] References Cited

U.S. PATENT DOCUMENTS

| | | | |
|---|---|---|---|
| 4,639,281 | 1/1987 | Sastry et al. | 148/407 |
| 5,366,570 | 11/1994 | Mazur et al. | 148/669 |

OTHER PUBLICATIONS

Evaluation of $A_5Si_3Z_x$ Intermetallics for Use as High Temperatures Structural Materials; published Jul., 1994, 26 pages; Thom, Meyer, Kim and Akinc.

"Contributions to the Nowotny Phases", Powder Metallurgy Bulletin, vol. B (1957), pp. 25–34, Parthe.

"Metals and Alloys", Acta. Cryst., vol. 10 (1957), pp. 768–769, Parthe.

Massalski (ed), Binary Phase Diagrams, vol. 2, ASM, 1986, pp. 2054, 2056–2057. Sauthoff, G.

Z. Metellkde 81 (1990) 855–861.

"Lattice dimensions of low–rate metalloid–staslized $Ti_5Si_3$" High Temperatures–High Pressures, vol. 6, 1974, pp. 515–517.

"Electronic Structure and Alloy Chemistry of the Transition Elements", J. Wiley & Sons, 1963, pp. 204–205, Hans Nowotny.

Primary Examiner—Melvyn Andrews
Assistant Examiner—Robert R. Koehler
Attorney, Agent, or Firm—Edward J. Timmer

[57] ABSTRACT

A titanium silicide material based on $Ti_5Si_3$ intermetallic compound exhibits substantially improved oxidative stability at elevated temperatures. In particular, carbon is added to a $Ti_5Si_3$ base material in an amount (e.g. about 0.3 to about 3.6 weight % C) effective to impart substantially improved oxidative stability at elevated temperatures, such as about 1000° C. Boron is added to a $Ti_5Si_3$ base material in an amount (e.g. about 0.3 to about 3.3 weight % B) to this same end.

3 Claims, 3 Drawing Sheets

CARBON OR BORON MODIFIED TITANIUM SILICIDE

CONTRACTUAL ORIGIN OF THE INVENTION

The United States Government has rights in this invention pursuant to Contract No. W-7405-Eng-82 between the Department of Energy and Iowa State University, which contract grants to the Iowa State University Research Foundation, Inc. the right to apply for this patent.

FIELD OF THE INVENTION

The present invention relates to high temperature materials and, more particularly, to a titanium silicide compound including carbon or boron in an amount effective to improve oxidation resistance.

BACKGROUND OF THE INVENTION $Ti_5Si_3$ is an intermetallic compound having low density, high melting point, and oxidation resistance below about 700° C. Although $Ti_5Si_3$ has been shown to exhibit adequate creep resistance at elevated temperature, for example, up to about 1200° C. it demonstrates inadequate oxidation resistance above about 700° C. For example, above about 700° C. the $Ti_5Si_3$ compound exhibits large mass gains as evidenced by extensive base material consumption and scale formation. The inadequate high temperature oxidative stability or resistance of the $Ti_5Si_3$ compound has limited its use in high temperature service applications as a potential replacement or reinforcement for the less creep resistant $MoSi_2$ intermetallic compound, ceramics, and superalloys.

It is an object of the present invention to provide a titanium silicide material based on $Ti_5Si_3$ and having substantially improved oxidative stability or resistance at elevated temperatures.

SUMMARY OF THE INVENTION

The present invention provides a titanium silicide based on $Ti_5Si_3$ modified with one of carbon and boron that can be used as a structural material (load bearing applications) in oxygen-bearing atmospheres (e.g air) at elevated temperatures. In particular, the present invention provides a titanium silicide material based on $Ti_5Si_3$ including an amount of carbon (C) effective to substantially improve oxidative stability or resistance at elevated temperatures, such as for example about 1000° C.

In accordance with an embodiment of the invention, the carbon-modified $Ti_5Si_3$ material comprises a small amount of carbon effective to achieve improved high temperature oxidative stability or resistance. At least about 0.3 weight % C is included to improve oxidation resistance.

More generally, the present invention involves inclusion of about 0.3 to about 3.6 weight % C, preferably about 0.9 to about 3 weight % C, in $Ti_5Si_3$ base material to achieve improved high temperature oxidative stability without any expected adverse affect on the creep resistance associated with the base material.

In another embodiment of the invention, boron-modified $Ti_5Si_3$ material comprises at least about 0.3 weight % B, generally about 0.3 to about 3.3 weight % B effective to achieve improved high temperature oxidative stability or resistance. A preferred boron concentration is about 0.8 to about 2.5 weight % B.

DETAILED DESCRIPTION OF THE INVENTION

Figure 1:
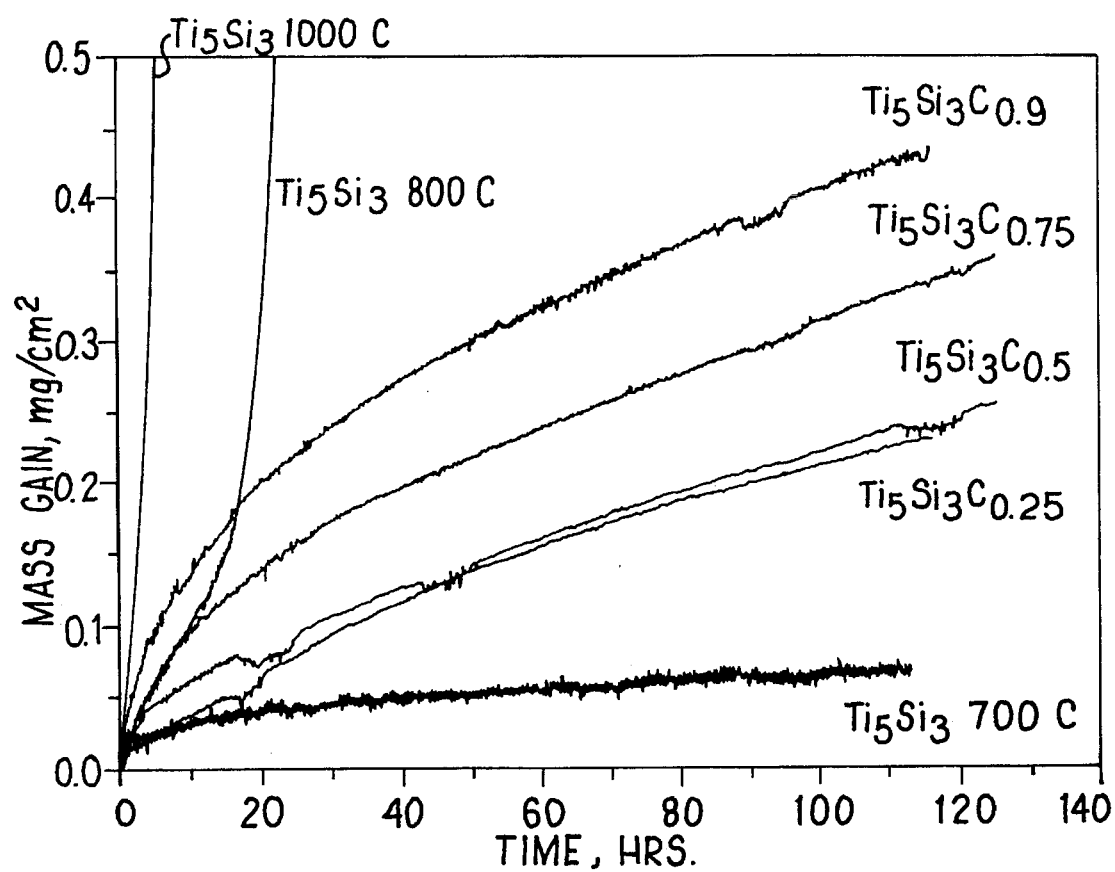
FIG. 1 illustrates the oxidation behavior of the C-modified $Ti_5Si_3C_x$ test coupons at 1000° C. and C-free $Ti_5Si_3$ test coupons at 700°, 800° and 1000° C.

The present invention provides a titanium silicide material based on $Ti_5Si_3$ intermetallic compound exhibiting unexpectedly improved oxidative stability or resistance at elevated temperatures. In particular, the present invention provides an amount of carbon or boron in the $Ti_5Si_3$ base material discovered to substantially improve oxidative stability at elevated temperatures, such as for example about 1000° C.

The present invention contemplates inclusion of at least about 0.3 weight % C and generally about 0.3 to about 3.6 weight % C in the $Ti_5Si_3$ base material to achieve improved high temperature oxidative stability or resistance. A more preferred range of carbon comprises from about 0.9 to about 3 weight % C.

In an embodiment of the invention, the carbon-modified $Ti_5Si_3$ material is made by mixing bulk elemental Ti, Si, and C in proportions to provide a desired final composition of carbon-modified $Ti_5Si_3$ material. The elemental mixture is placed in a water-chilled copper hearth and heated under an argon atmosphere by energization of a non-consumable tungsten electrode which subsequently arcs to the copper hearth so as to melt the mixture. Arc-melting is conducted to achieve a melt temperature of greater than 2130° C. and a compositionally homogeneous melt. The melt can be stirred with the tungsten electrode to homogenize the melt composition. The melt then is solidified in the copper hearth by terminating energization of the tungsten electrode. The resulting ingot of carbon-modified $Ti_5Si_3$ material can be processed to various forms, such as powder by comminution of the ingot by grinding in tungsten carbide lined mills. For purposes of further illustrating the invention, but not limiting the invention in any way, ingots comprising a composition (atomic formula) $Ti_5Si_3C_x$, where x is 0.25, 0.50, 0.75 and 0.9 were made by adding an appropriate amount of C to the $Ti_5Si_3$ compound. For example, $Ti_5Si_3C_x$ where x=0.25 (0.92 weight % C) was prepared by adding approximately 0.92 weight % of elemental bulk C to elemental bulk Ti and Si present in the amounts to form $Ti_5Si_3$. The mixture was arc-melted in a copper hearth under an argon atmosphere to form a melt of homogeneous composition. The melt was heated to a temperature of greater than 2130° C. and then allowed to solidify in the copper hearth to form a circular shaped ingot having about 20 mm (millimeter) diameter and about 5 mm thickness The $Ti_5Si_3C_x$ where x=0.50, 0.75 and 0.9 were similarly made with the addition of the appropriate amount of carbon.

Each ingot of $Ti_5Si_3C_x$ (x=0.25, 0.50, 0.75 and 0.9) was then comminuted in a tungsten carbide lined mill until the powder had a median particle size of about 1 micrometer. About 2 grams of each powder was cold (room temperature) pressed into a pellet at 5000 pounds per square inch using a ½ inch diameter steel die. Each resulting pellet was coated with a water based boron nitride solution and consolidated to near theoretical density by hot isostatically pressing at 1200° C. for 10 hours at 30,000 pound per square inch in a borosilicate encapsulating glass. A slow cooling rate of 1°–2° C. per minute must be used to reduce cracking of the sample.

An oxidation test coupon was diamond cut from each consolidated pellet. Each test coupon had dimensions of about 10 mm×5 mm×2 mm and was polished in successive steps to 0.3 µm aluminum oxide, and ultrasonically cleaned to remove residue from polishing. Specimens were washed in ethanol and dried at 105° C. in air before high temperature oxidation. For comparison purposes, an unmodified $Ti_5Si_3$ pellet (i.e. C-free $Ti_5Si_3$ pellet) was made in similar manner, and an oxidation test coupon was cut from the pellet for like oxidation testing. The oxidation test involved suspending each $Ti_5Si_3C_x$ (x=0.25, 0.50, 0.75 and 0.90) test coupon and the C-free $Ti_5Si_3$ test coupon from a sapphire wire in a vertical tube thermogravimetric analyzer. Compressed bottled air (water typically 3 parts per million (ppm) and total hydrocarbons typically less than 1 ppm) was flowed over the samples at 100 milliliters/minute. The specimen chamber was purged for 2 hours before each run with the oxidizing gas. Specimen temperature was then increased at 20° C./min. to a predetermined steady state temperature and held for times up to 120 hours. Specimen mass change and temperature were continuously recorded as functions of time.

FIG. 1 illustrates the oxidation behavior of the C-modified $Ti_5Si_3C_x$ test coupons at 1000° C. and C-free $Ti_5Si_3$ test coupons at 700°, 800° and 1000° C.

The $Ti_5Si_3C_x$ test coupons exemplary of the invention exhibited mass gains of 0.2 to 0.4 milligrams per centimeters squared ($mg/cm^2$) after 120 hours at 1000° C. in the flowing air. Microstructural examination of an oxidized $Ti_5Si_3C_x$ coupon showed an oxide scale thickness of only about 3 microns on the coupon surface, indicative of the excellent oxidation resistance of the carbon-modified $Ti_5Si_3$ material. This oxidation resistance (defined by mass gain of sample) was about equal to that of C-free $Ti_5Si_3$ compound tested at a lower 700° C. for the same time period in like flowing air. The comparison C-free $Ti_5Si_3$ test coupons oxidized at 1000° C. in the flowing air exhibited mass gains of 12 to 14 $mg/cm^2$ which represent a forty-fold increase in mass gain during the oxidation test. Microstructural examination of an oxidized C-free $Ti_5Si_3$ coupon showed an oxide scale thickness of about 300 microns or micrometers on the coupon surface, indicative of the poor oxidation resistance of the carbon-free $Ti_5Si_3$ material. The $Ti_5Si_3C_x$ test coupons pursuant to the invention exhibited at least a 60 times improvement in oxidation resistance as compared to the C-free $Ti_5Si_3$ test coupons oxidation tested under like conditions.

The creep resistance of the carbon modified $Ti_5Si_3$ material of the invention is expected to be comparable to that exhibited by C-free $Ti_5Si_3$ material. That is, the substantial improvement in oxidative stability or resistance of the C-bearing $Ti_5Si_3$ material of the invention is achieved without any expected adverse affect on the good high temperature creep resistance associated with the $Ti_5Si_3$ base material.

The carbon-modified $Ti_5Si_3$ compound of the invention possesses oxidation resistance and other properties for use as a monolithic structural material or member, or alternately as a strengthening reinforcement for conventional metals and alloys which suffer loss of strength and creep resistance at elevated temperature. Additionally, the carbon-modified $Ti_5Si_3$ compound is compatible with $MoSi_2$ intermetallic compound, which exhibits excellent high temperature oxidation resistance but suffers from high creep rate at elevated temperature, such as above about 1000° C. The carbon-modified $Ti_5Si_3$ thus may find use as a reinforcement for use with $MoSi_2$ to impart improved creep resistance thereto at elevated temperature.

The present invention also provides a titanium silicide material based on $Ti_5Si_3$ intermetallic compound exhibiting unexpectedly improved oxidative stability or resistance at elevated temperatures by virtue of including a small amount of boron in the $Ti_5Si_3$ base material discovered to substantially improve oxidative stability at elevated temperatures, such as about 1000° C. The present invention contemplates inclusion of at least about 0.3 weight % B and generally about 0.3 to about 3.3 weight % B in the $Ti_5Si_3$ base material to achieve improved high temperature oxidative stability or resistance. A more preferred range of boron comprises from about 0.8 to about 2.5 weight % B.

For purposes of further illustrating this embodiment of the invention, but not limiting the invention in any way, ingots comprising a composition (atomic formula) $Ti_5Si_3B_x$, where x is 0.25 and 0.75, were made in the same general manner described above for the carbon modified $Ti_5Si_3$ material.

Figure 2:
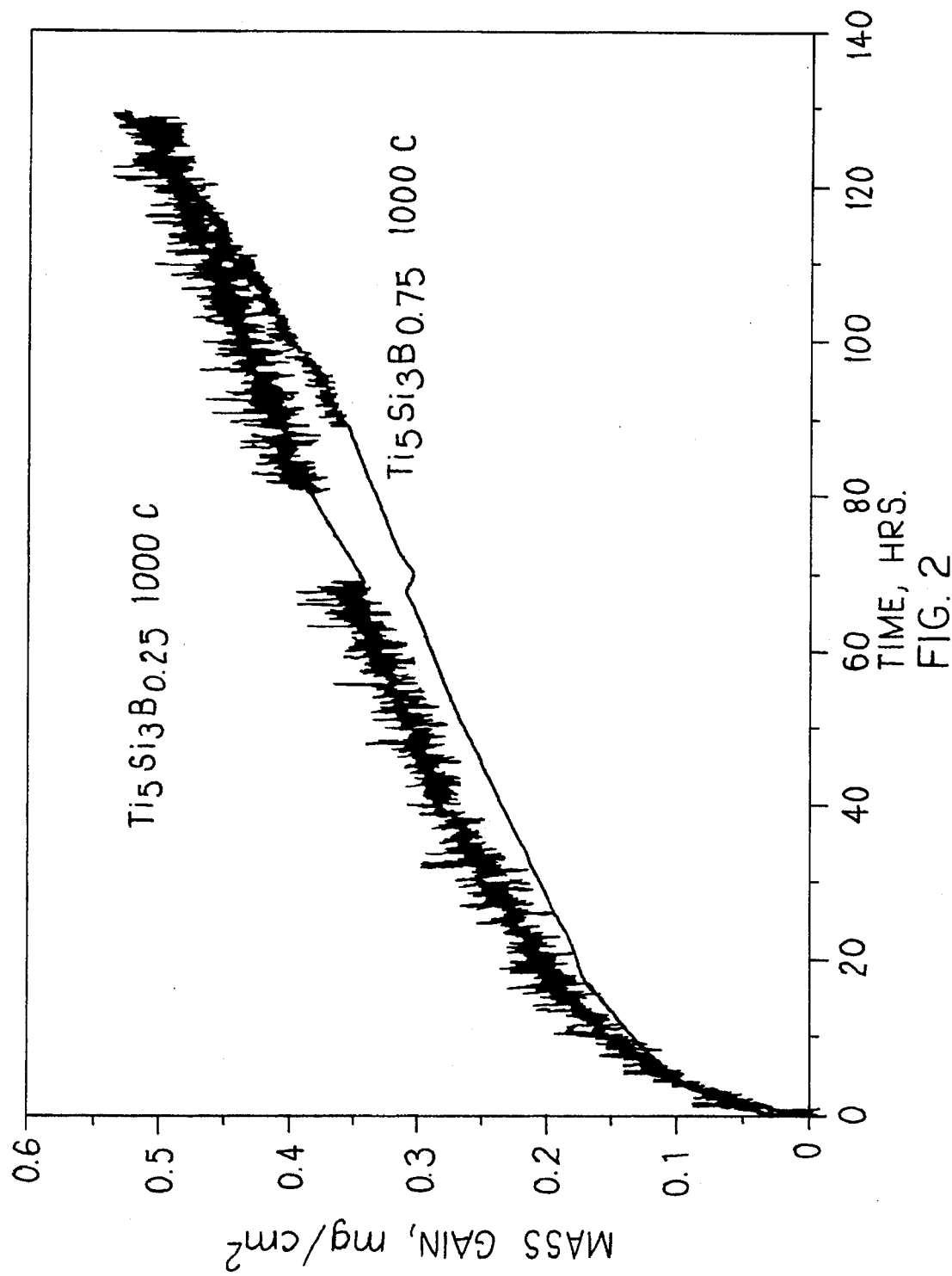
FIG. 2 illustrates the oxidation behavior of $Ti_5Si_3B_{0.25}$ and $Ti_5Si_3B_{0.75}$ test coupons at 1000° C.

FIG. 2 illustrates the oxidation behavior of $Ti_5Si_3B_{0.25}$ and $Ti_5Si_3B_{0.75}$ test coupons at 1000° C.

The $Ti_5Si_3B_x$ (x=0.25 and 0.75) test coupons exemplary of the invention exhibited mass gains of 0.45 to 0.50 milligrams per centimeters squared ($mg/cm^2$) after 120 hours at 1000° C. in flowing air under test conditions described above. This oxidation resistance (defined by mass gain of sample) was about equal to that of B-free $Ti_5Si_3$ compound tested at a lower 700° C. for the same time period in flowing air.

Figure 3:
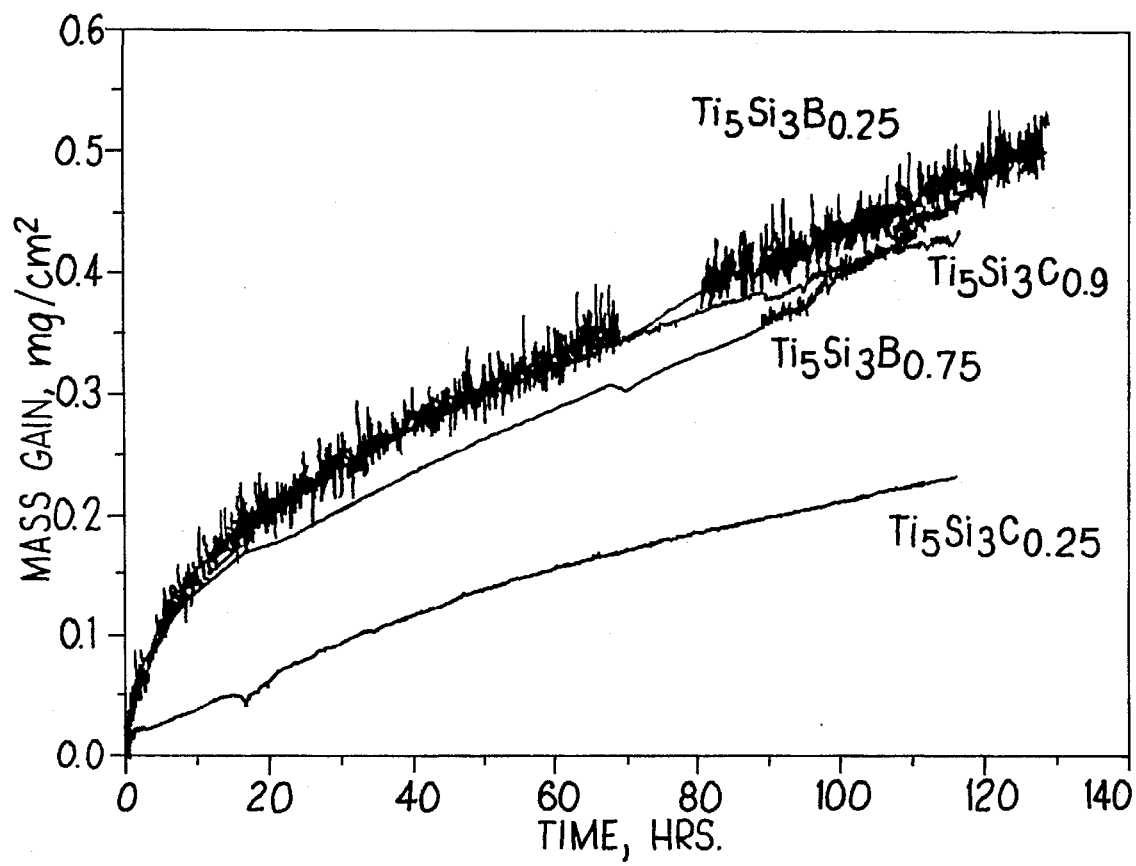
FIG. 3 provides comparative oxidation behavior of carbon-modified and boron-modified $Ti_5Si_3$ test coupons of the invention at 1000° C.

The $Ti_5Si_3B_x$ (x=0.25 and 0.75) test coupons were generally comparable in oxidation resistance to $Ti_5Si_3C_{0.9}$ at 1000° C. FIG. 3 provides comparative oxidation behavior of carbon-modified and boron-modified $Ti_5Si_3$ test coupons of the invention at 1000° C. However, the boron modified $Ti_5Si_3$ material deteriorates significantly by oxidation at 1200° C. after 24 hours.

The creep resistance of the boron modified $Ti_5Si_3$ material is expected to be comparable to that exhibited by B-free $Ti_5Si_3$ material. That is, the substantial improvement in oxidative stability or resistance of the B-bearing $Ti_5Si_3$ material of the invention is achieved without any expected adverse affect on the good high temperature creep resistance associated with the $Ti_5Si_3$ base material.

The boron-modified $Ti_5Si_3$ compound of the invention possesses oxidation resistance and other properties for use as a monolithic structural material or member, or alternately as a strengthening reinforcement for conventional metals and alloys which suffer loss of strength and creep resistance at elevated temperature. Additionally, the boron-modified $Ti_5Si_3$ compound is compatible with $MoSi_2$ intermetallic compound, which exhibits excellent high temperature oxidation resistance but suffers from high creep rate at elevated temperature, such as above about 1000° C. The boron-modified $Ti_5Si_3$ thus may find use as a reinforcement for use with $MoSi_2$ to impart improved creep resistance thereto at elevated temperature.

Although the invention has been described hereinabove with respect to certain illustrative embodiments of the invention, it is to be understood that modifications and changes can be made therein without departing from the spirit and scope of the invention as set forth in the following claims.

The embodiments of the invention in which an exclusive property or privilege is claimed are defined as follows:

We claim:

1. Titanium silicide comprising $Ti_5Si_3$ including at least one of carbon and boron in an amount of at least about 0.3 weight % to improve oxidation resistance.

2. The silicide of claim 1 wherein carbon is present in an amount of about 0.3 to about 3.6 weight % carbon.

3. The silicide of claim 1 wherein boron is present in an amount of about 0.3 to about 3.3 weight % boron.

* * * * *